(12) United States Patent
Thielen

(10) Patent No.: US 10,279,502 B2
(45) Date of Patent: May 7, 2019

(54) CUTTING TOOL HOLDER WITH A CONTROL MODULE

(71) Applicant: Dienes Werke Fuer Maschinenteile GmbH & Co. KG, Overath (DE)

(72) Inventor: Rolf Thielen, Cologne (DE)

(73) Assignee: Dienes Werke Fuer Maschinenteile GmbH & Co. KG, Overath (DE)

( * ) Notice: Subject to any disclaimer, the term of this patent is extended or adjusted under 35 U.S.C. 154(b) by 309 days.

(21) Appl. No.: 15/166,096

(22) Filed: May 26, 2016

(65) Prior Publication Data

US 2016/0346950 A1   Dec. 1, 2016

(30) Foreign Application Priority Data

May 29, 2015   (DE) .......................... 10 2015 108 506

(51) Int. Cl.
*B26D 7/26* (2006.01)
*B23Q 17/09* (2006.01)
(Continued)

(52) U.S. Cl.
CPC ....... *B26D 7/2635* (2013.01); *B23Q 17/0995* (2013.01); *B26D 1/151* (2013.01); *B26D 5/00* (2013.01); *B26D 5/005* (2013.01); *B26D 5/007* (2013.01); *B26D 5/086* (2013.01); *B26D 7/2621* (2013.01); *G05B 19/182* (2013.01); *B23Q 2717/003* (2013.01); *G05B 2219/31186* (2013.01); *G05B 2219/34444* (2013.01);
(Continued)

(58) Field of Classification Search
CPC .......... B23Q 17/0995; B23Q 2717/003; B26D 1/151; B26D 5/00; B26D 5/005; B26D 5/007; B26D 5/086; B26D 7/2621; B26D 7/2635; G05B 19/182; G05B 2219/31186; G05B 2219/34444; G05B 2219/37225; G05B 2219/45044

USPC .......................................................... 83/76.7
See application file for complete search history.

(56) References Cited

U.S. PATENT DOCUMENTS 6,112,658 A  *   9/2000   Gunther ................... B26D 5/00
                                                         101/171
6,463,352 B1 *  10/2002   Tadokoro ........... G05B 19/4187
                                                         700/159
(Continued)

FOREIGN PATENT DOCUMENTS

WO          2005063437 A1      7/2005

*Primary Examiner* — Kenneth M Lo
*Assistant Examiner* — Michael J Huntley
(74) *Attorney, Agent, or Firm* — Johnson, Marcou & Isaacs, LLC; Jennifer S. Stachniak

(57) ABSTRACT

A cutting tool holder (1) for holding and driving a cutting tool (2) includes at least one actuator (3) for adjusting at least one operating state of the cutting tool holder (1). A control module (4) is disposed on the cutting tool holder (1) and is connected with the actuator (3). The control module (4) directly and independently actuates the actuator (3); information about the operating state is storable on the control module (4). A TCP- and/or UDP-based server is disposed on the control module (4) so that information transmitted from a web-browser compatible end device (5, 6) about an operating state to be assumed can be received and information about the actual operating state can be transmitted to the web-browser compatible end device (5, 6).

16 Claims, 2 Drawing Sheets

(51) Int. Cl.
  *B26D 5/00*  (2006.01)
  *B26D 1/15*  (2006.01)
  *B26D 5/08*  (2006.01)
  *G05B 19/18* (2006.01)

(52) U.S. Cl.
  CPC .............. *G05B 2219/37225* (2013.01); *G05B 2219/45044* (2013.01)

(56) References Cited

U.S. PATENT DOCUMENTS

| | | | |
|---|---|---|---|
| 6,732,625 B1 | 5/2004 | Boynton et al. | |
| 8,707,838 B2* | 4/2014 | Supe-Dienes | B26D 7/2635 83/500 |
| 9,623,578 B1* | 4/2017 | Aminpour | B26D 5/005 |
| 9,884,430 B2* | 2/2018 | Rucker | B26D 5/06 |
| 2001/0000222 A1* | 4/2001 | Miyazaki | B26D 3/085 400/621 |
| 2005/0145688 A1* | 7/2005 | Milenkovic | G06Q 10/087 235/375 |
| 2005/0247173 A1* | 11/2005 | Alsten | B26D 5/00 83/13 |
| 2006/0200267 A1* | 9/2006 | Aamodt | B26D 5/005 700/122 |
| 2007/0005158 A1 | 1/2007 | Nicolson et al. | |
| 2009/0050003 A1* | 2/2009 | Dubois, III | B41C 1/14 101/129 |
| 2010/0116107 A1* | 5/2010 | Spillner | A22C 17/0033 83/13 |
| 2010/0217719 A1* | 8/2010 | Olsen | B26D 5/00 705/318 |
| 2010/0288091 A1* | 11/2010 | Weber | B26D 5/00 83/13 |
| 2011/0303063 A1* | 12/2011 | Stolyar | B26D 7/2635 83/76.1 |
| 2012/0197427 A1* | 8/2012 | Gallucci | B26D 5/005 700/114 |
| 2014/0000433 A1* | 1/2014 | Yamamoto | B26D 5/007 83/886 |
| 2014/0033886 A1* | 2/2014 | Hoover | B26D 5/02 83/39 |
| 2014/0320267 A1* | 10/2014 | Weber | B26D 3/24 340/10.4 |
| 2015/0127137 A1* | 5/2015 | Brandt | B23K 5/00 700/166 |
| 2015/0251267 A1* | 9/2015 | Winn | B23K 10/00 219/121.39 |
| 2015/0316919 A1* | 11/2015 | Junkers | F15B 19/002 700/275 |
| 2015/0371129 A1* | 12/2015 | Hoffa | B23K 5/00 340/10.2 |
| 2016/0031110 A1* | 2/2016 | Middleton | B26D 5/007 83/13 |
| 2016/0046033 A1* | 2/2016 | Zuech | B26D 5/007 700/127 |

* cited by examiner

CUTTING TOOL HOLDER WITH A CONTROL MODULE

Cross Reference to Related Applications

The instant application claims the priority date of May 29, 2015, the filing date of the German patent application, DE 10 2015 108 506.2.

BACKGROUND OF THE INVENTION

The present invention relates to a cutting tool holder for holding and driving a cutting tool, including at least one actuator for adjusting at least one operating state of the cutting tool holder.

With longitudinal cutting machines, typically a plurality of blade holders are arranged adjacent one another. Each blade hold includes an actuator, which can adjust the cutting tool, formed in particular as a circular knife, in the vertical direction. In addition, an actuator can be provided, which adjusts and presses the circular knife laterally. In order to determine an accurate position of the circular knife as well as the respective pressing force, corresponding sensors are provided. Further, further sensors can be provided, which monitor further parameters, such as, for example, the temperature of the circular knife mounting. Each individual actuator and each individual sensor of each blade holder is connected via its own cable with a central control unit, in particular with a control that is programmable from memory. In order to reduce the expense associated with the mounting of longitudinal cutting machines and during exchange or repositioning of the blade holders, it is already know to use BUS-systems, by means of which the data of the sensors and the control signals for the actuators are determined. A disadvantage of this type of design is that the operating states and the parameters of the cutting tool holder are accessible only from the superordinate control unit that is programmable from memory. In particular, the parameters that are relevant for monitoring of the cutting process are only centrally monitored. Furthermore, changes of the parameters and the operating states to be assumed in a following step can be adjusted centrally at the superordinate control unit only during an idle state. The fastest possible time for the change of the operating state, in addition, is predetermined by the running times of the BUS system, since each step of the operating state change of each blade holder is controlled centrally by the memory-programmable control unit. A mobile access for an operator, which is located on the longitudinal cutting machine, is not provided.

SUMMARY OF THE INVENTION

An object of the present invention is therefore to at least partially solve the above-noted problems associated with the state of the art and in particular, to provide a cutting tool holder and a method for operating a cutting machine, with which the operation of a cutting machine is simplified and with which a precise regulation of the actuator is possible.

These objects are solved, in particular, by a cutting tool holder, in particular a blade holder, with the above-noted features, whereby a control module that is connected to an actuator is mounted on the cutting tool holder. The control module directly and independently operates the actuator and information regarding the operating state can be stored on the control module, whereby on the control module, a TCP- and/or UDP-based server, in particular, a webserver, is provided, so that information from a web-browser compatible end device about an operating state that is to be assumed and information about the actual operation state can be transmitted to the web-browser compatible end device.

Preferably, the cutting tool holder is a blade holder and the cutting device is a circular blade or knife, whereby the circular blade or knife can be adjusted, in particular, by the actuator in the vertical direction and can be adjusted and pressed laterally by means of a further actuator, if necessary.

The control module on the cutting tool holder, in particular, is a CPU-supported computer and is not provided only for control, in particular, of all actuators of the cutting tool holder, but in addition to the operating states, in particular, also stores all further parameters of the cutting tool holder. Under the term "operating states", in particular, parameters are to be understood which can be changed directly by one or more actuators. In this connection, for example, the position of the cutting tool is included. Under the term "parameter", all such parameters are to be understood which can be affected generally only indirectly by means of the actuators. In this connection, for example, the storage temperature of the cutting tool and the diameter of a circular knife or blade in delivery condition and in actual condition are included.

The control module therefore is configured and equipped in order to autonomously bring the actuator from one operating state into another operating state, without having to resort to signals of a superordinate control unit during this change of the operating state. The control module preferably is directly connected with the actuator, so that the actuator changes the operating state of the cutting tool holder based on a signal from the control module. In this connection, the control module can directly provide the operating state to be adopted by means of a corresponding control signal or regulate by means of falling back on information from corresponding sensors of the actuator, in particular sensors connected directly with the control module, until achievement of the operating state to be assume. The change of the operating state can occur based on the individual actuation of the actuator by the control module in real time.

Furthermore, a TCP- and/or UDP-based server are provided on the control module, so that communication with the control module is enabled, in particular, by means of TCP/IP. By means of the TCP- and/or UDP-based server (referred to subsequently as "server"), it is possible that the basis of a standardized protocol can be communicated to the control module. The information stored on the control module, as far as this is released, can be released with web-browser compatible end devices and if necessary, also can be changed. In addition, information about the server with a web-browser compatible end device, in particular, about parameters of the cutting tool holder, can be stored on the control module. In particular, the operating state to be assumed can be stored by means of the server on the control module, so that preferably, after receipt of a release signal, the control module can autonomously bring about the operating state to be assumed by affecting the actuator.

Thus, on the one hand, the operation is simplified via, in particular mobile, web-browser compatible end devices and on the other hand, the precision of the change of the operating state is increased, since the control module, if necessary, after receipt of a release signal independently changes the operating state of the cutting tool holder via the actuator. The speed of the operating state change is thereby provided by means of the timed sequence of the control module to the cutting tool holder and not by means of the cycling times of a BUS-system or by means of the cycling times of a superordinate control unit. Thus, the adjustment times can be shortened, although the transmission rate of the Ethernet standard for transmission of information to the service, comparted with the transmission rates of a memory-programmable control unit, are longer. In particular, therefore, also no BUS nodes, which slow down the control, are required. With the present invention, it is possible, in particular, to retrieve operating states of the cutting tool holder each time via a mobile end device, whereby also operating states of the tool holder to be adopted can be predetermined by the mobile end device. Thus, operating states, which are to be assumed in a subsequent processing step, already can be predetermined during the actual operation. For example, with an intended re-positioning during the preceding processing, the later position to be assumed can be provided, which then is initiated directly during the idle state of the cutting tool. Thus, the operation of the cutting tool holder is markedly simplified.

In addition, at least one further parameter of the cutting tool holder can be stored on the control module, whereby at least the further parameter stored on the control module is retrievable and/or changeable by a superordinate control unit as well as by a mobile end device that does not directly influence the operation of the cutting tool holder.

The parameters stored on the control module, therefore, likewise are not only retrievable and in particular changeable by the superordinate control unit, but also by the mobile end device. The actual operating states of the cutting tool holder are directly changeable only by means of the control module, in particular first after release by means of the superordinate control unit. This means, in particular, that a parameter of the cutting tool holder can be detected by the mobile end device and this corresponding parameter then can be stored on the control module. The stored parameter is then, in turn, retrievable by the superordinate control unit so that this, if necessary, in dependence on the retrieved parameter, can permit a change of the operating state by means of the control module to a provided time.

The superordinate control unit, in particular, is a memory-programmable control unit, a CPU support computer and/or a similar control device. Preferably, the superordinate control unit is made up of a memory-programmable control unit and a Linux-based computer together for communication with the control modules.

Thus, it is now possible to retrieve stored parameters of the cutting tool holder via a mobile end device each time. In addition, it is possible to determine a change of the parameter with the mobile end device and to store it from the mobile end device onto the corresponding control module. Furthermore, also parameters from a cutting tool holder used in a subsequent processing step can be detected already during operation. Thus, the operation of the cutting tool holder is still further simplified.

In order to minimize the amount of cabling work involved of a cutting tool holder during its installation and exchange, it can be provided that the control module contains signals, in particular from the superordinate control unit as well as the energy from operation of at least the actuator via a single cable. This type of individual cable can be a cable with a RJ45 plug on its end, for example. The control module, in particular, is equipped such that it can make available different potentials, which supplies the actuator, at least one sensor and/or the control module with energy. The control module, then, is equipped, in particular, such that the voltages on the individual wires of the cable are converted into different constant potentials as supply voltages for the components of the cutting tool holder.

In order to eliminate the cabling of a sensor to the superordinate control unit, it can be provided that a sensor that determines a parameter and/or operating state of the cutting tool is connected directly with the control module. Thus, a cabling of the sensor only to the control module mounted on the cutting tool holder must take place.

It also can be provided that a parameter of the cutting tool holder or the cutting tool is detectable by means of a sensor that is not directly connected with the control module, in particular, which is integrated in the mobile end device, and in particular, is transmissible from the mobile end device to the control module and is storable on the control module. With such a configuration, the sensor can communicate wirelessly via suitable means with the control module to the cutting tool holder. In particular, in this connection, a camera of a mobile end device can be used to detect a parameter of the cutting tool holder and to store it on the control module. For example, the original diameter of a round knife or blade or the actual diameter of round knife or blade can be determined and are transmitted to the control module of the corresponding cutting tool holder. This has the advantage that, for example, with re-installation of a knife or blade, this can be very simply detected by means of the mobile end device and its parameters can be transmitted in a simple manner to the control module mounted on the cutting tool holder. The parameters associated with the cutting tool holder therefore are stored locally on the control module of the cutting tool holder.

So that a mobile end device can identify the cutting tool holder for which it must later determine a parameter on this cutting tool's control module, a one- or two-dimensional, machine-readable code can be formed on the outside or exterior of the cutting tool holder, which identifies the cutting tool holder, in particular for the mobile end device. The one-dimensional machine-readable code is, in particular, a barcode and the two-dimensional machine-readable code is, in particular, a QR code.

In addition, it can be provided that a one- or two-dimensional, machine-readable code is formed on the cutting tool, which provides an initial state of the cutting tool, so that the initial state, in particular, is detectable for the mobile end device, whereby the initial state can be transmitted to the control module and stored on the control module. The "initial state" of the cutting tool refers to, in particular, its diameter, its width or its further properties. Thus, the initial state of the cutting tool can be detected very simply and can be transmitted to the control module of the cutting tool holder, on which the cutting tool is mounted.

In order to permit a friction-free operation of a cutting machine, it can be provided that the control module is configured so that a change of an operating state takes place only after prior release via the superordinate control unit.

The above-noted objects are also solved by a cutting machine with a plurality of cutting tool holders according to the present invention, which include a central, superordinate control unit, in particular, memory-programmable control, which controls or regulates the plurality of cutting tool holders.

The above-noted objects are also solved by a method for operating a cutting machine with a plurality of cutting tool holders, including at least the following steps:
  a) detecting at least one operating state of a cutting tool holder and storing the detected operating state on a control module of the cutting tool holder;
  b) providing an operating state that is to be assumed by means of a superordinate control unit or by means of mobile end device that does not directly influence the operation of the cutting tool holder, wherein the operating state to be assumed is stored on the control module of the cutting tool holder by means of a TCP- and/or UDP-based server formed on the control module;

c) transmitting a start signal to the control module of the cutting tool holder; and d) changing the operating state of the cutting tool holder exclusively under the regime of the control module until the operating state to be assumed is achieved.

Thus, the result is that the control module can be put into execution independently by the predetermined functions of the operating state to be assumed, without having to take into consideration the cycling times of the superordinate control unit. The change of the operating state takes place based on the independent actuation of the actuator through the control module in real time. For example, the operating state to be assumed can be a position of the knife or blade, which is executed by the control module in dependence on the signal from the locator connected to the control module by means of independent control of a motor, which adjusts the blade or knife and is formed as an actuator.

In particular, it can be provided that in step a), additionally at least one parameter of the tool holder is detected and stored on the control module of the tool holder and the stored parameter and the operating state is retrieved and/or changed by means of a superordinate control unit or by means of a mobile end device that does not directly effect the operation of the cutting tool holder, whereby in particular in a step 3), a cutting process is performed with a plurality of the cutting tool mounting practice under the regime of the superordinate control unit in dependence on the retrieved parameter, whereby in particular, the operating states of the individual cutting tool holders are adjusted depending on the retrieved, changed parameters through regulation by the respective control module.

Since the parameter(s) can be detected in a simple manner by a mobile end device, the operation of a cutting device is further simplified, whereby the operating expense is reduced.

So that a sensor that is not connected with the cutting tool holder can detect and transmit a parameter of the cutting tool holder, it is provided that in step a), a sensor connected indirectly with the control module of a cutting tool holder detects at least one parameter and/or operating state of the cutting tool, which is transmitted by means of the mobile end device to the server formed on the control module of the cutting tool holder and is stored on the control module.

In this connection, the cutting tool holder can be identified next by means of the mobile end device via a one- or two-dimensional machine-readable code formed on the cutting tool holder. Thus, the user can select in a simple manner the cutting tool holder for which it will next detect a parameter. If necessary, the association of the cutting tool holder also can take place after detection of the parameter.

It also can be provided that an initial state of a cutting tool of the cutting tool holder is determined by means of the mobile end device via a one- or two-dimensional, machine-readable code formed on the cutting tool and by means of the mobile end device, is transmitted to the control module of the cutting tool holder and is stored on the control module.

In particular, step d) does not take place without release by means of the superordinate control unit.

The details and features disclosed with reference to the inventive device can be transferred to the corresponding points of the inventive method, and vise versa.

BRIEF DESCRIPTION OF THE DRAWINGS

The invention as well as the technical background is explained in an exemplary manner next with reference to the figures, whereby it is noted that the figures show a preferred embodiment of the invention, without limiting the invention thereto. The drawings show.

DETAILED DESCRIPTION OF THE PREFERRED EMBODIMENTS

Figure 1:
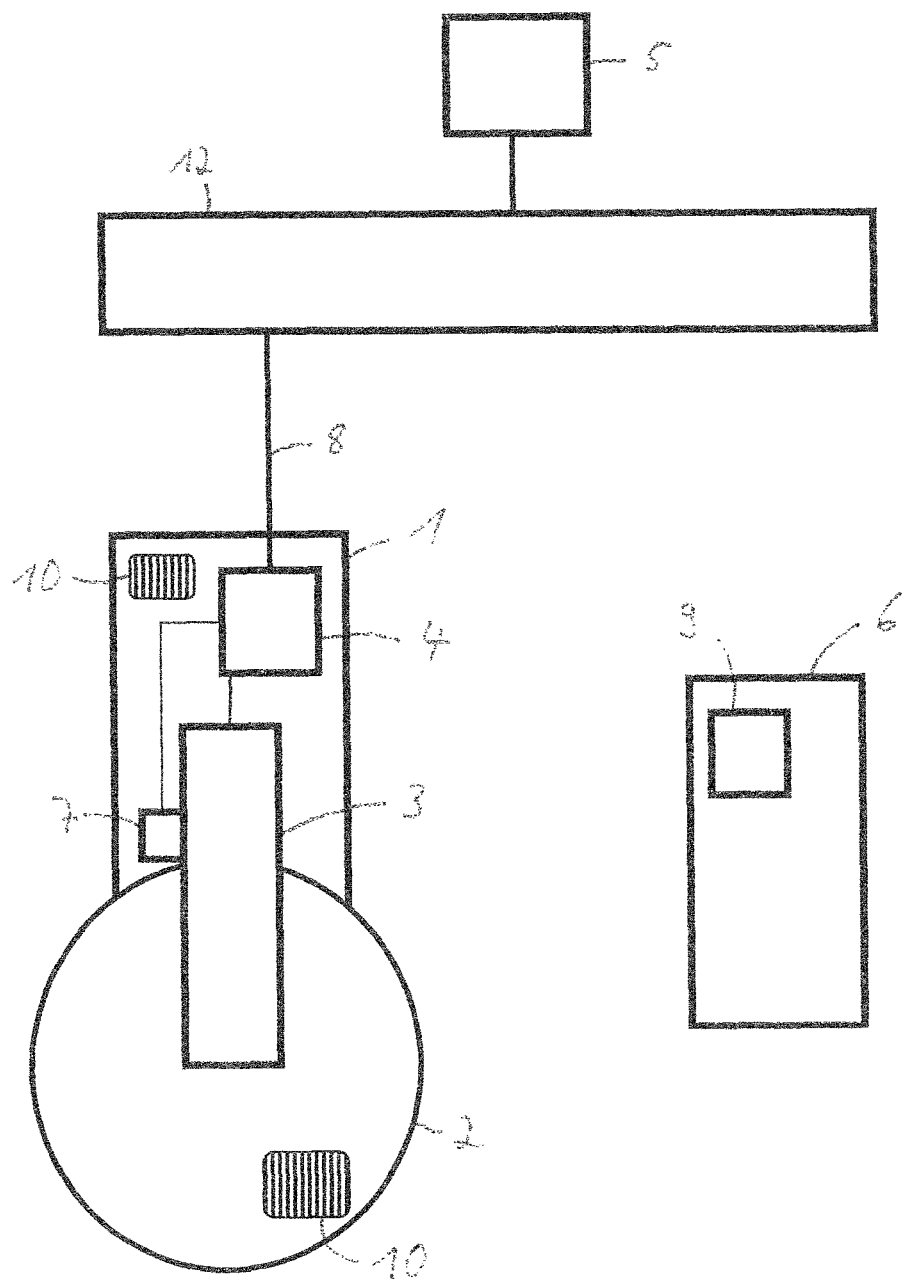
FIG. 1 shows a cutting device holder and a mobile end device.

In FIG. 1, a blade holder 1 is shown with a circular knife or blade 2 mounted thereon, whereby the circular blade 2 can be changed in its position relative to the blade holder 1 by means of an actuator 3. A control module 4 is mounted on the blade holder 1, the control module 4 being connected via corresponding lines with the actuator 3 and a first sensor 7. The first sensor 7 is configured to determine the position of the circular blade 2. A machine-readable code 10 is formed on the blade holder 1 and the circular blade 2, respectively.

The blade holder 1, which is attached to a traverse via a suitable attachment means (not specifically shown) is connected via a cable 8 and a network 12 with a superordinate control unit. In addition, a mobile end device 6 is shown in FIG. 1, which has a second sensor 9 in the form of a camera.

The control module 4 is configured, such that it converts itself the electrical potential provided by the multi-wire cable 8 into supply voltages for the control module 4, the sensor 7 and the actuator 3.

The invention contemplates that the control module 4 independently actuates the actuator 3 and that information about the operating state of the blade holder 1 is stored on the control module 4. In addition, a TCP- and/or UDP-based server is provided on the control module 4, so that the information stored on the control module 4, for example about the TCP/IP protocol, is transmittable to the superordinate control unit 5 and to the mobile end device 6. Furthermore, operating states that are to be assumed and parameters of the blade holder 1 from the mobile end device 6 can be stored on the control module 4.

For example, via the mobile end device 6 and the service on the control module 4, a position for the circular blade 2 that is to be assumed can be stored on the control module 4. After the superordinate control unit 5 has released the state to be assumed and transmitted a start signal to the control module 4, the control module 4 independently actuates the actuator 3 by accessing the signals sent by the first sensor 7. During the intake of the operating state, therefore, no communication between the control module 4 and the superordinate control unit 5 must occur. In principal, the cutting tool holder 1 could be operated without the superordinate control unit 5.

The code 10 arranged on the blade holder 1 serves first to enable identification of the blade holder 1 via the second sensor 9 of the mobile end device 6, so that a parameter or operating state of the blade holder 1 to be detected subsequently by the mobile end device 6 can be associated with this blade holder 1. This type of parameter can be the diameter of the circular blade 2, whereby, for example, the original diameter can be detected by the mobile end device 6 by means of the code 10 arranged on the circular blade 2. Thus, in a simple manner, an operator first can identify the corresponding blade holder 1 and then detect the associated parameter for this blade holder 1 and send it to the corresponding control module 4.

Figure 2:
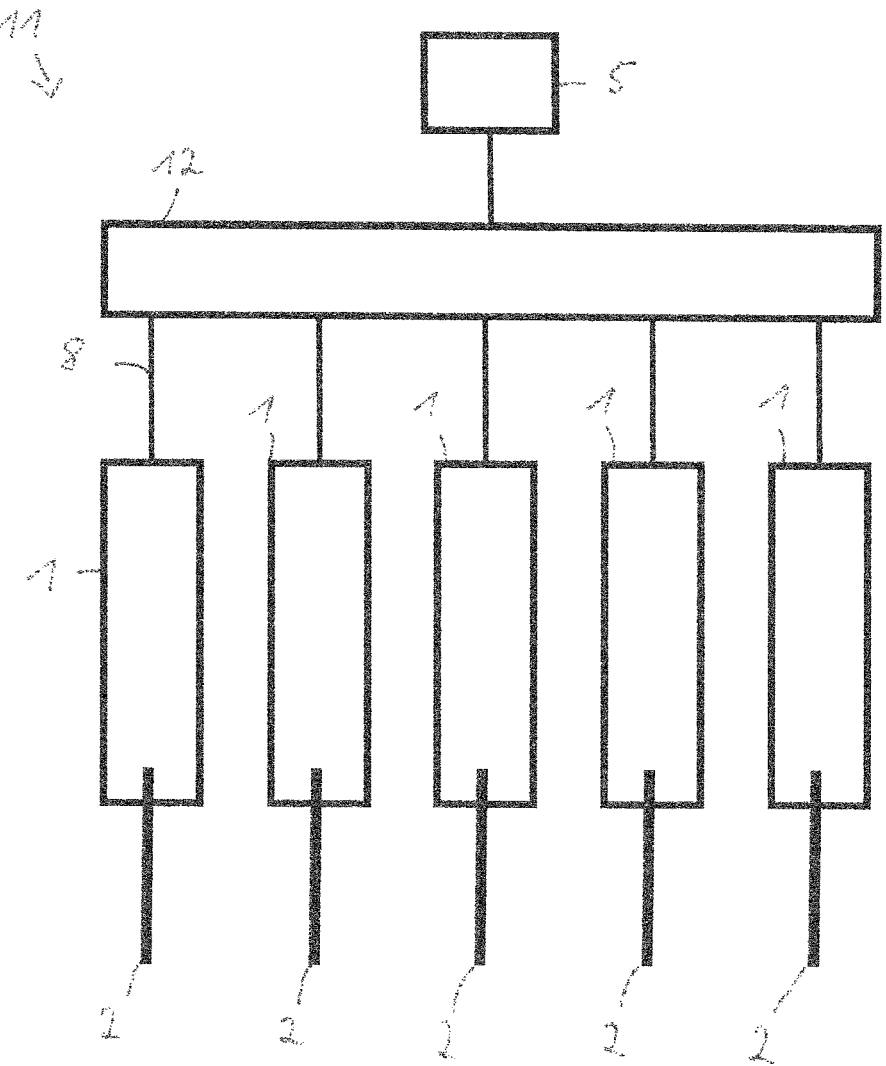
FIG. 2 shows a longitudinal cutting machine with a plurality of cutting tool holders.

In FIG. 2, a cutting machine 11 with a plurality of blade holders 1 described with reference to FIG. 1 is shown, which, respectively, are connected via cable 8 and a network 12 with a superordinate control module 5. As described previously with reference to the example in FIG. 1, a user with a mobile end device 6 can provide the operating state to be assumed of each blade holder 1, determine parameters of the blade holder 1, and transmit via the server formed on the control module 4 of the blade holder 1 to the corresponding control module 4. After release by the superordinate control unit 5, then the predetermined cutting process can take place.

With the present invention, the operation of a cutting machine 11 is greatly simplified and the precision of the changing of the operation state of the blade holder 1 is increased. The specification incorporates by reference the disclosure of DE 10 2015 108 506.2, filed May 29, 2015.

The present invention is, of course, in no way restricted to the specific disclosure of the specification and drawings, but also encompasses any modifications within the scope of the appended claims.

REFERENCE NUMERAL LIST 1 blade holder
2 circular knife or blade
3 actuator
4 control module
5 superordinate control unit
6 mobile end device
7 first sensor
8 cable
9 second sensor
10 code
11 cutting machine
12 network

I claim:

1. A cutting machine (11) in the form of a longitudinal cutting machine with a plurality of cutting tool holders (1) for holding and driving a cutting tool (2), each cutting tool holder comprising:
   at least one actuator (3) for adjusting at least one operating state of the cutting tool holder (1);
   a control module (4) connected to the at least one actuator (3), wherein the control module (4) is mounted on the cutting tool holder (1), wherein the control module (4) directly and independently actuates the at least one actuator (3), and wherein the control module (4) is configured to store information about the at least one operating state;
   a TCP- and/or UDP-based server disposed on the control module (4), so that information from a web-browser compatible end device (6) about an operating state to be assumed is retrievable and information about an actual operating state is transmittable to the web-browser compatible end device (6),
   said cutting machine (11) including a central, superordinate control unit (5), wherein said superordinate control unit (5) controls the plurality of cutting tool holders (1).

2. The cutting machine (11) according to claim 1, wherein at least one further parameter of the cutting tool holder (1) is storable on the control module (4), wherein the at least one further parameter stored on the control module (4) is retrievable and/or changeable by a superordinate control unit (5) and by the mobile end device (6) that does not directly effect operation of the cutting tool holder (1).

3. The cutting machine (11) according to claim 1, wherein the control module (4) contains signals from a superordinate control unit (5) and energy to drive the at least one actuator (3) via an individual cable (8).

4. The cutting machine (11) according to claim 1, whereby a sensor (7) configured to detect a parameter and/or the at least one operating state of the cutting tool is directly connected with the control module (4).

5. The cutting machine (11) according to claim 1, wherein a parameter and/or operating state of the cutting or the cutting tool (2) is detectable via a sensor (9) that is not directly connected with the control module (4).

6. The cutting machine (11) according to claim 5, wherein the sensor (9) is integrated into the mobile end device (6), and wherein the parameter and/or operating state is transmitted from the mobile end device (6) to the control module (4) and is storable on the control module (4).

7. The cutting machine (11) according to claim 1, wherein a one- or two-dimensional, machine-readable code (10) is formed on an exterior of the cutting tool holder (1), wherein the code (10) identifies the cutting tool holder (1) for the mobile end device (6).

8. The cutting machine (11) according to claim 1, wherein a one- or two-dimensional, machine-readable code (10) is formed on the cutting tool (2), wherein said code (10) provides an initial state of the cutting tool (2), so that the initial state is detectable by the mobile end device (6), whereby the initial state is transmittable to the control module (4) and is storable on the control module (4).

9. The cutting machine (11) according to claim 1, wherein the control module (4) is configured such that a change of the at least one operating state occurs only after a prior release by a superordinate control unit (5).

10. A method for operating a cutting machine (11) in the form of a longitudinal cutting machine (11) with a plurality of cutting tool holders (1), comprising at least the following steps:
    a) detecting at least one operating state of a cutting tool holder (1) and storing the detected operating state on a control module (4) of the cutting tool holder (1);
    b) providing an operating state to be assumed via a superordinate control unit (5) or via a mobile end device (6) that does not directly effect operation of the cutting tool holder, wherein the operating state to be assumed is stored by means of a TCP- and/or UDP-based server on the control module (4) of the cutting tool holder;
    c) transmitting a start signal to the control module (4) of the cutting tool holder (1); and
    d) changing the control state of the cutting tool holder (1) exclusively by regulation from the control module (4) until the operating state to be assumed is achieved.

11. The method according to claim 10, wherein in step a), at least one parameter of the cutting tool holder (1) is additionally detected and is stored on the control module (4) of the cutting tool holder (1) and the stored parameter and the operating state are retrieved and/or changed by a superordinate control unit (5) or by a mobile end device (6) that does not directly effect operation of the cutting tool holder (1).

12. The method according to claim 11, further comprising:
    e) performing a cutting process with a plurality of the cutting tool holders (1) through regulation by the superordinate control unit (5) in dependence on the retrieved parameter, whereby the operate states of the cutting tool holder (1) are adjusted in dependence on the retrieved, changed parameters through regulation by the respective control module (4).

13. The method according to claim 10, wherein in step a), a sensor (9) connected indirectly with the control module (4) of a cutting tool holder (1) detects at least one parameter and/or operating state of the cutting tool, wherein the at least on e parameter and/or operating state is transmitted via the mobile end device (6) to the TCP- and/or UDP-based server formed on the control module (4) of the cutting tool holder (1) and is stored on the control module (4).

14. The method according to claim 13, wherein the cutting tool holder (1) first is identified by the mobile end device (6) by means of a one- or two-dimensional, machine-readable code formed on the cutting tool holder (1).

15. The method according to claim 13, wherein an initial state of a cutting tool (2) of the cutting tool holder (1) is determined by the mobile end device (6) by means of a one- or two-dimensional, machine-readable code formed on the cutting tool (2) and is transmitted by means of the mobile end device (6) to the control module (4) of the cutting tool holder (1) and is stored on the control module (4).

16. The method according to claim 10, wherein step d) is not performed without release by the superordinate control unit (5).

\* \* \* \* \*